US011429266B2

(12) United States Patent
Ritter

(10) Patent No.: US 11,429,266 B2
(45) Date of Patent: Aug. 30, 2022

(54) MASTER DATA-DEPENDENT USER INTERFACE ADAPTATION

(71) Applicant: SAP SE, Walldorf (DE)

(72) Inventor: Gerd Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/110,798

(22) Filed: Dec. 3, 2020

(65) Prior Publication Data

US 2022/0179544 A1 Jun. 9, 2022

(51) Int. Cl.
*G06F 3/048* (2013.01)
*G06F 3/04845* (2022.01)
*G06F 9/30* (2018.01)
*G06F 9/451* (2018.01)
*G06F 3/0482* (2013.01)

(52) U.S. Cl.
CPC ...... *G06F 3/04845* (2013.01); *G06F 9/30094* (2013.01); *G06F 9/451* (2018.02); *G06F 3/0482* (2013.01)

(58) Field of Classification Search
CPC .. G06F 3/04845; G06F 9/451; G06F 9/30094; G06F 3/0482; G06F 3/0481; H04N 1/00501
See application file for complete search history.

(56) References Cited

U.S. PATENT DOCUMENTS

| 6,781,607 | B1* | 8/2004 | Benham | G06F 21/6218 |
| | | | | 715/744 |
| 7,533,345 | B2* | 5/2009 | Krebs | G06F 8/38 |
| | | | | 715/744 |
| 10,254,945 | B1* | 4/2019 | Gupta | G06N 20/00 |
| 2012/0137235 | A1* | 5/2012 | T S | G06F 8/38 |
| | | | | 715/763 |
| 2015/0113449 | A1* | 4/2015 | Moon | G06F 9/451 |
| | | | | 715/762 |
| 2020/0169559 | A1* | 5/2020 | Jones | H04L 63/102 |

* cited by examiner

*Primary Examiner* — Mahelet Shiberou
(74) *Attorney, Agent, or Firm* — Buckley, Maschoff & Talwalkar LLC

(57) ABSTRACT

In response to a request to present a first user interface to a first user, a first user interface adaptation associated with the first user interface is determined, a first control flag associated with the first user interface adaptation and with a first condition is determined, the first condition based on a value of first master data, and the value of the first master data for the first user is determined, the first control flag is evaluated based on the value of the first master data for the first user. If the first control flag evaluates to True, the first user interface adaptation is applied to the first user interface and the adapted first user interface is presented to the first user and, if the first control flag evaluates to False, the first user interface is presented to the first user.

16 Claims, 13 Drawing Sheets

Sales Orders

| Account | Primary Contact |
|---|---|
| Status | Approval Status |

520

Overview  Products  Parties  Activities  Sales Documents  Attachments

Parties

Products

500

Adaptation Mode

Tabs  510

⌄ Add

|| Overview >
|| Products >
|| Pricing >
|| Parties >
|| Approval >
|| Document Flow >
|| Activities >
|| Sales Documents >
|| Tickets >
|| Attachments >
|| Notes >

User Restriction ☒

| Field | Value |
|---|---|
| SalesOrg | Germany |

*FIG. 5*

Sales Orders — 600

Sales Orders

Customer    Primary Contact

Status      Approval Status
— 620

Overview  Products  Parties  Sales Documents  Attachments

Parties

[ ]

Products

[ ]

Adaptation Mode

Tabs — 610

[ v Add ]

| Overview      | > |
| Products      | > |
| Pricing           | > |
| Parties       | > |
| Approval          | > |
| Document Flow     | > |
| Activities        | > |
| Sales Documents | > |
| Tickets           | > |
| Attachments   | > |
| Notes             | > |

User Restriction  ☒

| Field    | Value  |
|----------|--------|
| SalesOrg | France |

*FIG. 6*

Sales Orders 500

| | | | | | | Adaptation Mode |
|---|---|---|---|---|---|---|
| Account 720 | | Primary Contact | | | | Account Field 710 |
| Status | | Approval Status | | | | Visible? ✗ |
| | | | | | | Move |
| Overview | Products | Parties | Activities | Sales Documents | Attachments | Label ▷ |
| | | | | | | Value ▷ |

Parties

Title: Account  [Save]

Products

User Restriction ✗

| Field | Value |
|---|---|
| Territory | South Bavaria |

Sales Orders

| | | 600 |
|---|---|---|
| Customer | Primary Contact | Adaptation Mode |
| | | Account Field — 910 |
| Status | Approval Status | |
| | | Visible? ☒ |
| | | Move |

Overview | Products | Parties | Activities | Sales Documents | Attachments

Parties

Label >
Value >

Title
[ Customer ]  ( Save )

Products

User Restriction ☒

| Field | Value | OP |
|---|---|---|
| Territory | Brittany | OR |
| Territory | Côte d'Azur | |

| Sales Orders | | | | | | Adaptation Mode | |
|---|---|---|---|---|---|---|---|
| Customer | | Primary Contact | | | | Account Field | *—1010* |
| Status | | Approval Status | | | | Visible? | ☒ |
| | | | | | | | Move |
| Overview | Products | Parties | Activities | Sales Documents | Attachments | Label | > |
| | | | | | | Value | > |

Parties

[ ]

Title
[ Customer ] (Save)

Products

[ ]

User Restriction ☒

| Field | Value | OP |
|---|---|---|
| Territory | Brittany | OR |
| Territory | Côte d'Azur | OR |
| SalesOrg | Austria | OR |
| Account | Nestlé | OR |
| Country | Switzerland | |

FIG. 10

Sales Orders — 600

Customer — 820  
Primary Contact  
Status  
Approval Status

Overview | Products | Parties | Activities | Sales Documents | Attachments

Parties

Products

Adaptation Mode

Account Field — 1110

Visible? ✗

Move

Label >
Value >

Title  
Customer | Save

User Restriction ✗

| Field | Value | OP |
|---|---|---|
| SalesOrg | Austria | AND |
| Account | Nestlé | |

*FIG. 11*

Sales Orders

Customer 820  Primary Contact

Status  Approval Status

Overview  Products  Parties  Activities  Sales Documents  Attachments

Parties

Products

Adaptation Mode

Account Field — 1210

Visible? ☒

Move

Label >

Value >

Title

Customer  (Save)

User Restriction ☒

OR
( AND (SalesOrg=Switzerland,
 Account=Nestlé),
Territory=Austria,
AND (SalesOrg=Switzerland,
Account=Roche)

MASTER DATA-DEPENDENT USER INTERFACE ADAPTATION

BACKGROUND

Conventional user interface (UI) applications include an adaptation mode which allows authorized users (e.g., administrators, key users) to modify the UIs of the UI applications. Such modifications (i.e., UI adaptations) may relate to field visibility, field naming, screen layout, extension fields, data validation, etc. When a user request to access a thusly-modified UI is received, the UI adaptations are applied to the UI and the adapted UI is presented to the user.

It may be desirable to present certain UI adaptations to some users and other UI adaptations to other users. In order to do so, a UI adaptation may be associated with one or more user roles. For example, a manager accessing a particular UI will be presented with the particular UI as adapted by UI adaptations associated with the manager role, while a group director would be presented with the particular UI as adapted by UI adaptations associated with the group director role.

User roles are typically used to determine data authorizations (i.e., the data which a user is allowed to access). Therefore, if a UI designer wishes to assign different UI adaptations to two different users having a same role and same data authorizations, it becomes necessary to define a new role having the same data authorizations but being assigned to the different UI adaptations. This approach may cause management of user roles to quickly become unwieldy, due to changes in users' roles and to any other changes which might require changing the association between a given user and particular UI adaptations (i.e., changing which of the UI adaptations the given user sees).

Systems are desired to efficiently manage the associations between UI adaptations and desired users.

BRIEF DESCRIPTION OF THE DRAWINGS

FIG. 5 is a user interface including elements to create master data-dependent user interface adaptations according to some embodiments.

FIG. 6 is a user interface including elements to create master data-dependent user interface adaptations according to some embodiments.

FIG. 7 is a user interface including elements to create master data-dependent user interface adaptations according to some embodiments.

FIG. 8 is a user interface including elements to create master data-dependent user interface adaptations according to some embodiments.

FIG. 9 is a user interface including elements to create master data-dependent user interface adaptations according to some embodiments.

FIG. 10 is a user interface including elements to create master data-dependent user interface adaptations according to some embodiments.

FIG. 11 is a user interface including elements to create master data-dependent user interface adaptations according to some embodiments.

FIG. 12 is a user interface including elements to create master data-dependent user interface adaptations according to some embodiments.

FIG. 13 is a user interface including elements to create master data-dependent user interface adaptations according to some embodiments.

DETAILED DESCRIPTION

Figure 1:
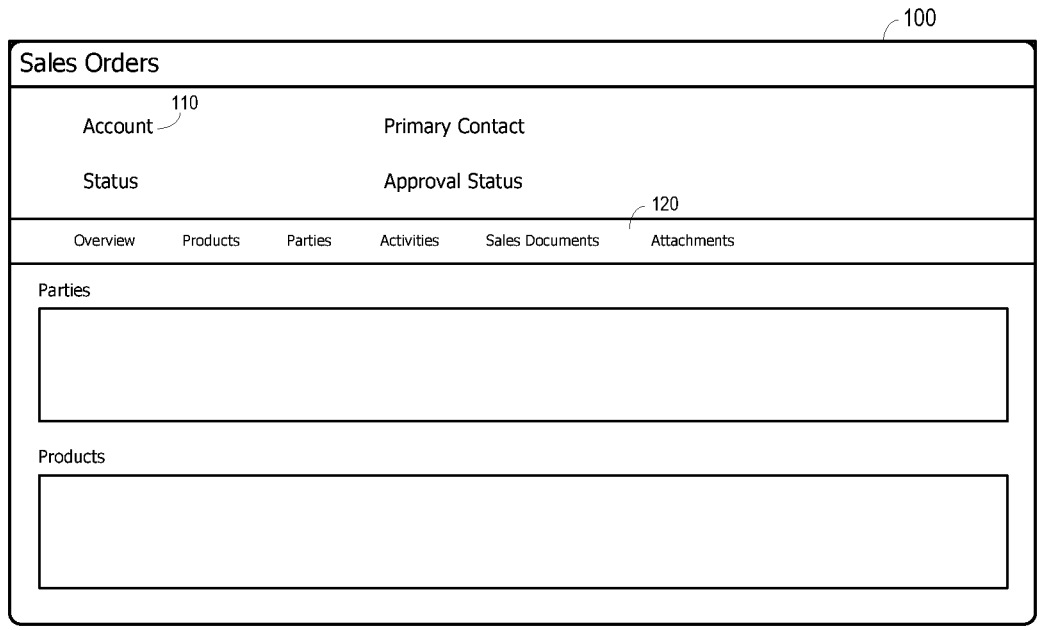
FIG. 1 is a user interface including one or more master data-dependent user interface adaptations according to some embodiments.

The following description is provided to enable any person in the art to make and use the described embodiments. Various modifications, however, will remain readily-apparent to those in the art.

Some embodiments facilitate the association of UI adaptations with users. The associations may be based on data associated with the user, and in particular on data other than the organizational role of the user. Such data may be referred to as master data of the user.

Master data may include, but is not limited to, demographic information of the user, a user's organization, country, region, territory, currency, language, or any other user-specific information. Such information may be stored in one or more database tables in association with the user as is known in the art. In addition to being based on master data, the associations between UI adaptations and users may also or alternatively be based on organizational roles according to some embodiments.

According to some embodiments, UI adaptations may include but are not limited to, defining or deleting sections of a UI, inserting, hiding, deleting or moving fields within a section of a UI, using extension fields within a UI, exposing different facets, changing field names, and changing data validations or defaulting associated with particular UI fields. Embodiments may be used in conjunction with any other known type of UI adaptation.

In some embodiments, a UI adaptation may be associated with a control flag during design of the UI adaptation. The control flag may indicate that the UI adaptation is associated with users who are assigned to the "France" Sales Organization (i.e., SalesOrg=France). Accordingly, if a user assigned to the "France" Sales Organization accesses a UI with which the UI adaptation is associated, the UI adaptation is presented to the user. In some embodiments, the UI is adapted based on the UI adaptation and the adapted UI is presented to the user.

Then, if the user is eventually re-assigned to the "Germany" Sales Organization (i.e., SalesOrg=Germany) and accesses the UI, the UI will be presented to the user without the UI adaptation. Of course, a different UI adaptation of the UI may be associated with SalesOrg=Germany, in which case the UI is adapted based on the different UI adaptation and the thusly-adapted UI is presented to the user.

Continuing this example, a user may be assigned to SalesOrg=Germany at the time a UI adaptation is created and associated with SalesOrg=France. Accordingly, as described above, this UI adaptation will not be presented to the user if the user accesses the corresponding UI. However, if the user is re-assigned to SalesOrg=France and then accesses the UI, the UI presented to the user will reflect the UI adaptation.

According to some embodiments, association of a UI adaptation with control flags that are based on user data is facilitated by predefined rules which allow the UI application to evaluate the control flags. The rules may operate to fetch the master data associated with a particular user and evaluate the data against a logical expression (e.g., SalesOrg=Germany) associated with the control flag. Such predefined rules may facilitate the design of UI adaptations without requiring software coding.

Control flags may be evaluated based on any information associated with a user, including but not limited to management level, residence country, responsible territory, responsible account, etc. Values against which the user data may be compared to evaluate the control flags are selectable depending on the type of value, and some embodiments may provide corresponding value help (e.g., value help showing possible SalesOrg values, value help showing possible Country values, a true/false drop box).

Embodiments may advantageously reduce the need for complex software coding to control selective delivery of UI adaptations to appropriate users, while increasing flexibility of the delivery and providing automatic behavior updates in response to changes to master data. Embodiments may further provide intuitive reuse of existing master data with the UI designer is familiar, without requiring additional maintenance of the master data.

FIG. 1 shows UI 100 including one or more master data-dependent UI adaptations according to some embodiments. In some embodiments, a user operates a client device (e.g., a desktop computer) to launch a UI application for execution by the client device and display of UI 100. Some scenarios for acquiring and executing a UI application will be described in detail below.

UI 100 is intended to display data associated with Sales Orders, but embodiments are not limited thereto. According to some embodiments, UI 100 reflects both a "base" UI (i.e., a UI without any applied UI adaptations) and one or more UI adaptations to the base UI which are associated with the user who launched the UI application. More particularly, prior to display of UI 100, UI adaptations associated with UI 100 are determined. The UI adaptations may be designed by a key user or other administrative user according to some embodiments. Control flags associated with each UI adaptation are determined, where the control flags are based on user master data values as described above.

The control flags are evaluated based on master data values associated with the current user. Accordingly, corresponding master data values of the user must be acquired to perform the evaluations. For example, if the control flag associated with a UI adaptation evaluates to True based on the associated user master data values, it is determined to adapt the base UI based on the UI adaptation and display the adapted UI to the user. A UI application may include any number of base UIs according to some embodiments. More than one control flag may be associated with a UI adaptation, and zero or more UI adaptations may be associated with a given base UI.

UI adaptations and associated control flags may be nested according to some embodiments. For example, a parent UI adaptation to a UI may be associated with a parent control flag (e.g., SalesOrg=Germany), a first child UI adaptation may be associated with a first child control flag (e.g., Territory=North Bavaria), and a second child UI adaptation may be associated with a second child control flag (e.g., Territory=South Bavaria). Accordingly, if SalesOrg=Germany and Territory=North Bavaria are True for a given user, the parent UI adaptation and the first child UI adaptation are applied to the UI for display to the user, but if SalesOrg=Germany and Territory=South Bavaria are True for a given user, the parent UI adaptation and the second child UI adaptation are applied to the UI for display to the user.

Continuing the above example, if SalesOrg=Germany is false for the given user, none of the parent UI adaptation, the first child UI adaptation, or the second child UI adaptation is applied to the UI. However, if SalesOrg=Germany and both Territory=North Bavaria and Territory=South Bavaria are false, the parent UI adaptation is applied to the UI and neither the first child UI adaptation or the second child UI adaptation is applied to the UI.

Figure 2:
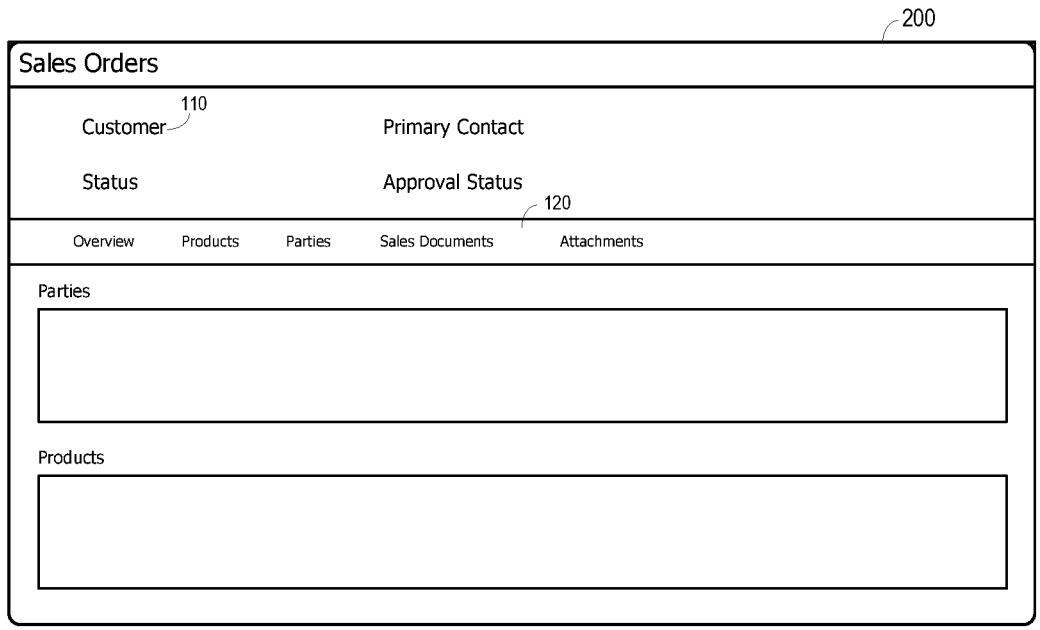
FIG. 2 is a user interface including one or more master data-dependent user interface adaptations according to some embodiments.

UI 200 of FIG. 2 is also intended to display data associated with Sales Orders and is associated with the same base UI as UI 100. It will be assumed that UI 200 has been accessed by a different user than UI 100. It will also be assumed that the master data of the FIG. 2 user differs from the master data of the FIG. 1 user such that the UI adaptations applied to the base UI as reflected in UI 200 are different from those applied to the base UI as reflected in UI 100.

More particularly, UI 200 reflects a UI adaptation which changes the name of field from Account to Customer. UI 200 also reflects a UI adaptation which deletes Activities tab from tab bar 120. These changes may be part of a single UI adaptation associated with a single control flag, or each change may be part of its own respective UI adaptation associated with its own control flag. In the latter example, the control flags of each UI adaptation may be identical.

Figure 3:
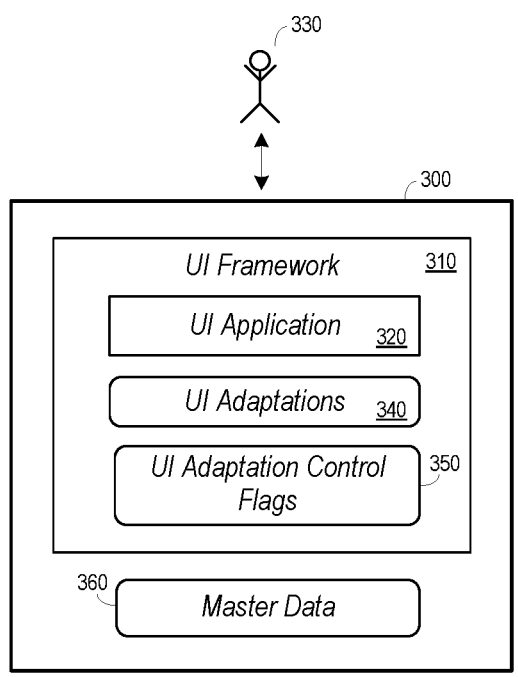
FIG. 3 illustrates a system to present a user interface including one or more master data-dependent user interface adaptations according to some embodiments.

FIG. 3 is a block diagram of system 300 to implement master data-specific UI adaptations according to some embodiments. System 300 may include client-side components and server-side components according to some embodiments. System 300 is not limited to the illustrated components.

The illustrated components of system 300 may be implemented using any suitable combinations of computing hardware and/or software that are or becomes known. In some embodiments, two or more components of system 300 are implemented by a single computing device. One or more components may be implemented as an on-premise system and/or a cloud service (e.g., Software-as-a-Service, Platform-as-a-Service) which is local to or remote from one or more other components and in communication therewith via any number and type of communication networks.

System 300 includes UI framework 310. According to some embodiments, UI framework 310 may facilitate execution of UI applications such as UI application 320 by system 310. UI framework 310 may provide libraries for implementing entities described in code of UI application 320. UI framework 310 may also include an execution platform for executing UI application 320. According to some embodiments, UI framework 310 comprises an HTML5-based UI framework.

UI application 320 may comprise one or more UI components which are used along with framework 310 to generate and present a UI to user. UI application 320 may encode non-adapted, or base, UIs for presentation to user 330. UI adaptations 340 may be defined and stored at design-time. As described above, each of UI adaptations 340 may be associated with one or more UIs and may described one or more modifications to the associated UI.

As also described above, each association between a UI and a UI adaptation 340 may be further associated with a UI adaptation control flag 350. A UI adaptation control flag 350 comprises a logical statement which, if True for a given user 330, indicates that the associated UI should be modified per the associated UI adaptation 340 prior to presentation to the given user 330. UI adaptation control flags 350 are also defined and stored at design time as will be described below.

Master data 360 may comprise values associated with user 330 and any other users. Master data 360 may include, but is not limited to, demographic information of the user, a user's organization, country, region, territory, currency, language, or any other user-specific information. Master data 360 may be provided to system 300 from an application server upon loading UI application 320, UI adaptations 340 and UI adaptation control flags 350 into system 300.

The values of master data 360 may be limited to those values which are needed to evaluate UI adaptation control flags 350. For example, if none of UI adaptation control flags 350 require evaluation of a user postal code, then master data 360 may omit user postal code values.

Figure 4:
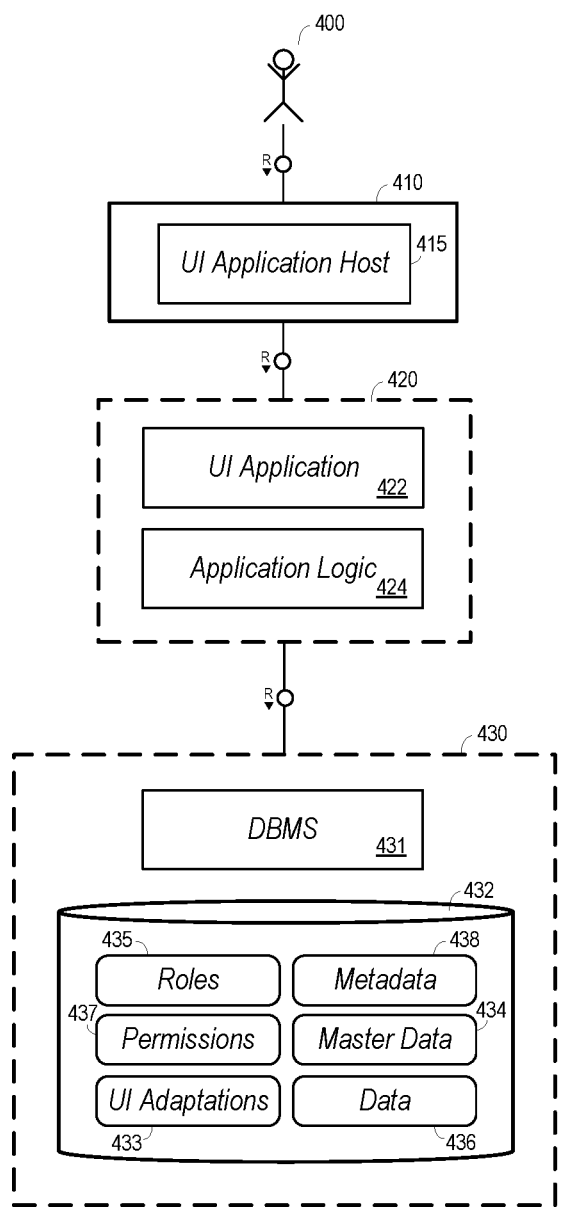
FIG. 4 illustrates a system to design and present user interfaces including one or more master data-dependent user interface adaptations according to some embodiments.

FIG. 4 is a block diagram of a system to design and present user interfaces including one or more master data-dependent user interface adaptations according to some embodiments. The illustrated components of FIG. 4 may be implemented using any suitable combinations of computing hardware and/or software that are or becomes known. In some embodiments, two or more components are implemented by a single computing device. One or more components may be implemented as an on-premise system and/or a cloud service (e.g., Software-as-a-Service, Platform-as-a-Service) which is local to or remote from one or more other components and in communication therewith via any number and type of communication networks.

In some embodiments, user 400 operates client device 410 (e.g., a desktop computer, a cellular telephone) to execute a Web browser application. User 400 may select or otherwise input into the Web browser application a Uniform Resource Locator associated with UI application host 415, which may comprise a launchpad application, causing the Web browser to display a corresponding Web page. According to some embodiments, user 400 is subjected to an authorization protocol (e.g., password, multi-factor authentication) by client device 410 prior to being presented with the Web page.

In some implementations, the Web page displays tiles corresponding to various UI applications provided by application server 420. A corresponding one of these tiles may be selected to request UI application 422. In response, UI application 422 is provided to client device 410 for execution by UI application host 415. UI application 422 may comprise one or more UI components (e.g., executable program code and/or data) which are executed and/or rendered by UI application host 415 to generate and present corresponding UIs to user.

As described above, UI adaptations may also be provided to user 400 along with UI application 422. The UI adaptations may be provided from UI adaptations 433, which may be defined and stored at design-time in data storage 432 of back-end database system 430. As mentioned above, UI adaptations 433 may be associated with control flags which depend upon on user-associated master data and/or user roles.

According to some embodiments, all UI adaptations 433 associated with a given UI application 422 are provided to client device 410 with the given UI application 422. Also provided are master data 434 and roles 435 associated with the requesting user 400. As described with respect to FIG. 3, UI application host 415 then determines which of the provided UI adaptations 433 are associated with user 400 based on the master data 434 and roles 435 and adapts UIs for presentation to user 400 based only on the identified UI adaptations. In other embodiments, application server 420 or database system 430 may determine which of UI adaptations 433 are associated with user 400 based on master data 434 and roles 435 and provide only the determined UI adaptations 433 to client device 410.

The UIs presented to user 400 include data provided to client device 410 by application logic 424. Application logic 424 acquires data (e.g., transactional data) from database system 430. For example, application logic 424 may generate queries against data 436 and database management system 431 may return corresponding result sets. Application logic 424 may process the result sets as desired and return the processed result sets to client device 410 for display as is known in the art.

Database management system 431 may return result sets based on permissions 437. Permissions 437 may specify data of data 436 to which user 400 has access or to which user 400 does not have access. Accordingly, a same query may result in a different result set for a first user 400 than for a second user 400. Permissions 437 may be based on roles 435 associated with a user but embodiments are not limited thereto.

Metadata 438 describes the format of data stored within database system 430. For example, metadata 438 may describe one or more database schema to which the stored data conform as is known in the art. Any of the data stored within database 430 may comprise one or more of conventional tabular data, row-based data, column-based data, and object-based data. The data may be distributed among several relational databases, dimensional databases, and/or other data sources. Moreover, the data may be indexed and/or selectively replicated in an index to allow fast searching and retrieval thereof.

Database 430 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

As described above, UI adaptations may be created at design-time by any user authorized to do so. Such creation may include associating one or more control flags with each UI adaptation. A control flag specifies one or more master data-based conditions which, if True for a given user, indicate that the UI adaptation is associated with the user. The associated UI adaptation should therefore be applied to a corresponding UI presented to the user.

FIGS. 5 through 13 illustrate user interfaces which may be used at design-time to create UI adaptations and to create control flags to associate with the UI adaptations. For example, a key user may enter an adaptation mode during execution of a UI application. In this mode, the key user may change UI nodes of the UI application. The changes may include creating, moving, destroying, hiding, unhiding, renaming and changing other characteristics of one or more UI nodes. One or more UI changes may be saved as a UI adaptation among UI adaptations 433.

User interface 500 of FIG. 5 may be presented to a key user to provide adaptation of a Sales Order UI according to some embodiments. User interface 500 is similar to user interface 100 of FIG. 1 except for Adaptation Mode section 510. In some embodiments, a key user requests a Sales Order UI as described above and is presented with an option to enter an adaptation mode which results in display of Adaptation Mode section 510.

In the illustrated example, Adaptation Mode section 510 allows modification of Tabs displayed in tab bar 520. The bolded tabs are selected for display in tab bar. It will be assumed that this selection differs from the base Sales Order UI and therefore reflects a UI adaptation. Accordingly, a User Restriction (i.e., a control flag) is defined for association with the UI adaptation.

The user restriction restricts the UI adaptation to users associated with a master data SalesOrg field having the value Germany. Embodiments may employ any other suitable UI metaphor for defining a control flag. As described above, the UI adaptation will only be applied to the base Sales Order UI if the master data of the requesting user includes SalesOrg=Germany.

Each UI adaptation and its associated control flag(s) may be saved to UI adaptations 433 for later deployment to any suitable user 400 as described above.

User interface 600 of FIG. 6 illustrates another UI adaptation associated with the Sales Order UI. Adaptation Mode section 610 has been manipulated to remove the Activities tab from tab bar 620. Moreover, the defined user restriction specifies SalesOrg=France. Accordingly, the UI adaptation shown in Adaptation Mode section 610 will only be applied to the base Sales Order UI if the master data of the requesting user includes SalesOrg=France.

FIG. 7 represents another UI adaptation of Sales Order UI 500 according to some embodiments. Adaptation Mode section 710 includes controls for adapting Account field 720 of Sales Order UI 500. Adaptation Mode section 710 also includes an area for associating the UI adaptation with particular master data values. In the present example, the UI adaptation is associated with users having Territory=South Bavaria.

The UI adaptation of FIG. 5 is therefore used to adapt the Sales Order UI for users having SalesOrg=Germany, while the UI adaptation of FIG. 7 is used to further adapt the Sales Order UI for those users having Territory=South Bavaria. If a user is associated with SalesOrg=Germany but not associated with Territory=South Bavaria, only the UI adaptation of FIG. 5 is applied. If a user is associated with Territory=South Bavaria but not associated with SalesOrg=Germany, only the UI adaptation of FIG. 7 is applied.

Figure 8:
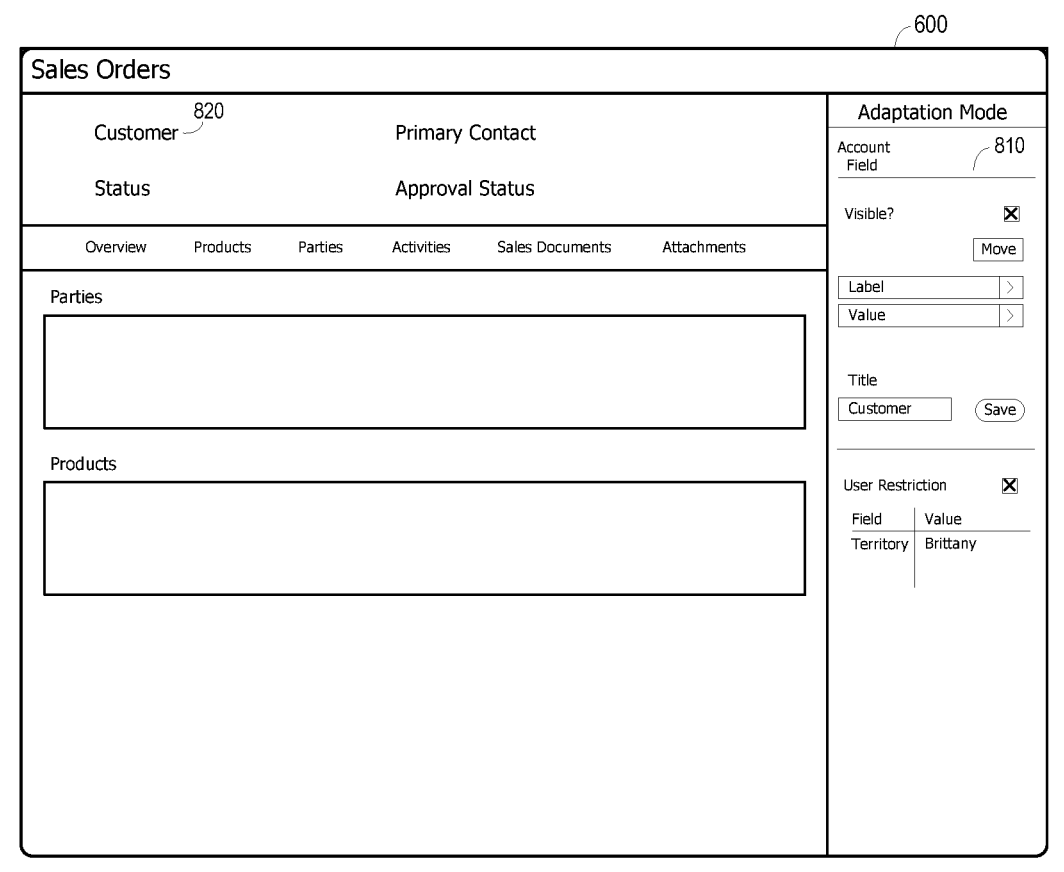

User interface 600 of FIG. 8 illustrates another UI adaptation of Sales Order UI 600 of FIG. 6. Adaptation Mode section 810 has been manipulated to change the Title of Account field 820 to Customer. Adaptation Mode section 810 has further been manipulated to define the user restriction (i.e., control flag) Territory=Brittany. The UI adaptation shown in Adaptation Mode section 810 will therefore only be applied to the base Sales Order UI if the master data of the requesting user includes Territory=Brittany.

The UI adaptation of FIG. 6 is therefore used to adapt the Sales Order UI for users having SalesOrg=France, and the UI adaptation of FIG. 8 will further adapt the Sales Order UI for those users having Territory=Brittany. Only the UI adaptation of FIG. 6 is applied if a user is associated with SalesOrg=France but not associated with Territory=Brittany.

If a user is associated with Territory=Brittany but not associated with SalesOrg=France, only the UI adaptation of FIG. 8 is applied.

FIG. 9 illustrates an example of Boolean operators to define a control flag associated with a UI adaptation according to some embodiments. User interface 600 of FIG. 9 is identical to user interface 600 of FIG. 8, but the control flag within Adaptation Mode section 910 has been changed to Territory=Brittany OR Territory=Côte d'Azur. Accordingly, the UI adaptation of FIG. 9 is applied to the Sales Order UI for those users having master data Territory=Brittany OR Territory=Côte d'Azur.

Any other Boolean combination of master data values may be defined as a control flag associated with a UI adaptation. In this regard, FIG. 10 illustrates an example in which the control flag within Adaptation Mode section 1010 has been changed to Territory=Brittany OR Territory=Côte d'Azur OR SalesOrg=Austria OR Account=Nestlé OR Country=Switzerland. In this example, Account=Nestlé indicates that the user is a member of a team employees responsible for the Nestlé account. Accordingly, the UI adaptation of FIG. 10 is applied to the Sales Order UI for those users having master data Territory=Brittany OR Territory=Côte d'Azur OR SalesOrg=Austria OR Account=Nestlé OR Country=Switzerland.

FIG. 11 illustrates an example of a control flag using an AND operator. The control flag within Adaptation Mode section 1110 specifies SalesOrg=Austria AND Account=Nestlé. The UI adaptation of FIG. 11 is therefore applied to the Sales Order UI for users having master data SalesOrg=Austria AND Account=Nestlé. Any combination of Boolean operators may be used in some embodiments. Other systems for crafting logical expressions may also be employed. For example, user interface 600 of FIG. 12 illustrates the use of "Polish" notation to define a control flag within Adaptation Mode section 1210.

Figure 13:
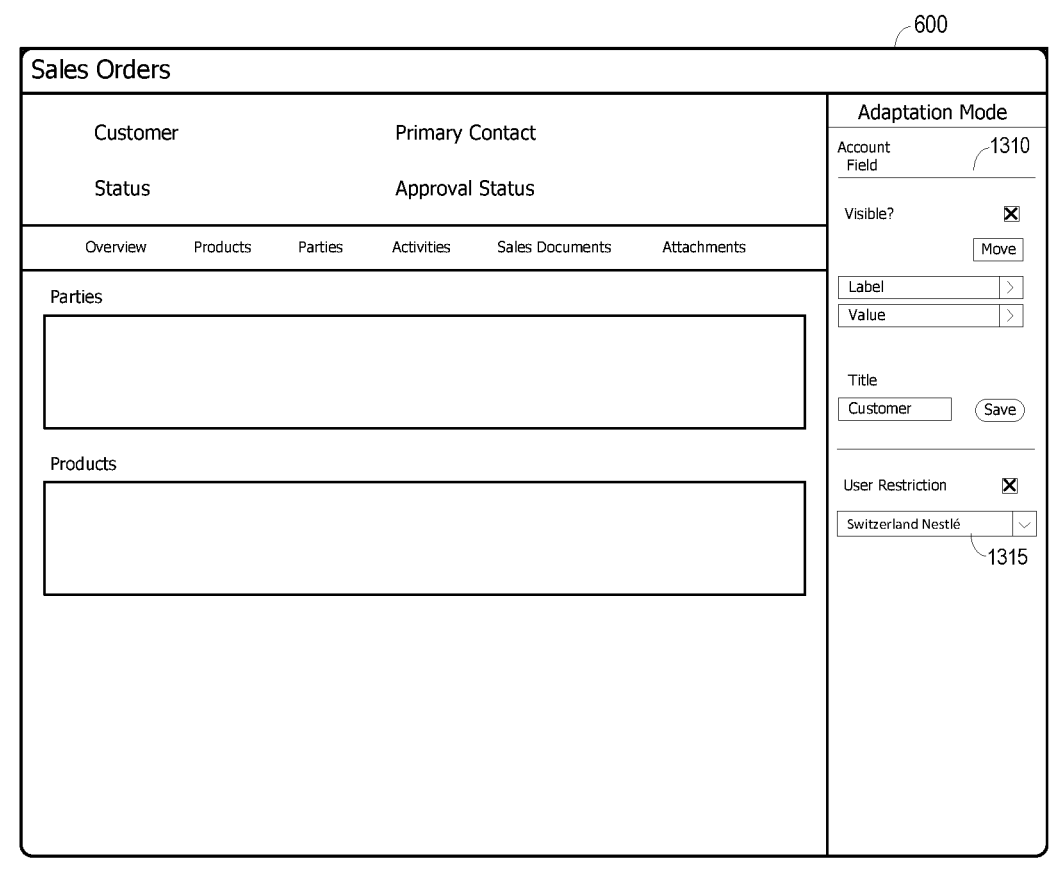

In yet another embodiment, FIG. 13 shows Adaptation Mode section 1310. Adaptation Mode section 1310 includes drop-down list 1315 for selecting one or more pre-stored control flag expressions for association with the UI adaptation. In this regard, any control flag defined for association with an Adaptation UI, using and metaphor for defining the control flag, may be stored (e.g., in database system 430) for later selection and association with any other UI adaptation. A UI adaptation may be associated with more than one pre-defined control flag.

Figure 14:
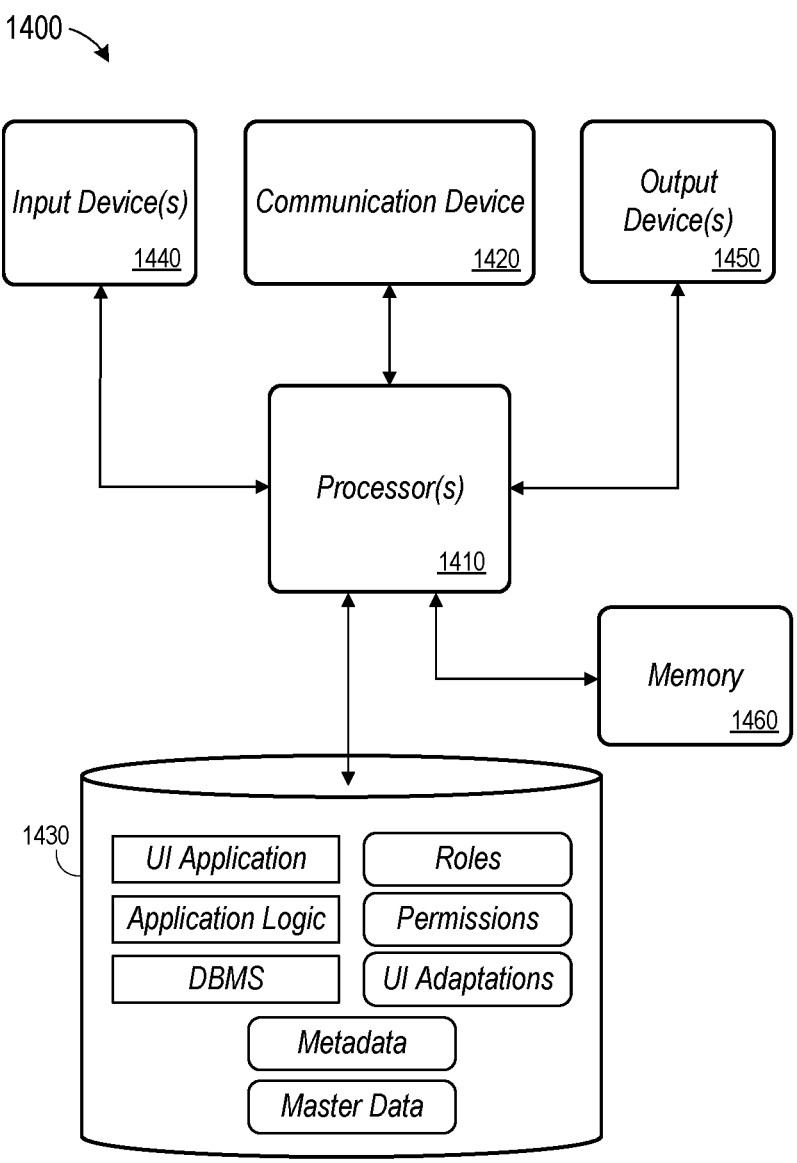
FIG. 14 is a block diagram of a system to provide design and presentation of user interfaces including one or more master data-dependent user interface adaptations according to some embodiments.

FIG. 14 is a block diagram of apparatus 1400 according to some embodiments. Apparatus 1400 may comprise a general-purpose computing apparatus and may execute program code to perform any of the functions described herein. Apparatus 1400 may comprise an implementation of application server 420 and database system 430 in some embodiments. The elements of apparatus 1400 may be distributed across several physical devices, and apparatus 1400 may include other unshown elements according to some embodiments.

Apparatus 1400 includes processing unit 1410 operatively coupled to communication device 1420, data storage device 1430, one or more input devices 1440, one or more output devices 1450 and memory 1460. Communication device 1420 may comprise a network card for communication with external networks. Input device(s) 1440 may comprise, for example, a keyboard, a keypad, a mouse or other pointing device, a microphone, knob or a switch, an infra-red (IR) port, a docking station, and/or a touch screen. Input device(s) 1440 may be used, for example, to enter information into apparatus 1400. Output device(s) 1450 may comprise, for example, a display (e.g., a display screen), a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, etc., while memory 1460 may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media, and executed by one or more hardware processors of one or more computing systems. Such media may include, for example, a hard disk, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    a memory storing processor-executable program code;
    a processing unit to execute the processor-executable program code to cause the system to:
        receive a request to present a first user interface application to a first user; and
        in response to the request:
            receive the first user interface application and at least one user interface adaptation defined and stored at design-time in a data storage;
            determine, from the received at least one user interface adaptation, a first user interface adaptation associated with the first user interface application;
            determine a first control flag associated with the first user interface adaptation and with a first condition, the first condition based on a value of first master data;
            determine the value of the first master data for the first user;
            evaluate the first control flag based on the value of the first master data for the first user;
            in an instance the first control flag evaluates to True, apply the first user interface adaptation to the first user interface application and present the adapted first user interface application to the first user; and
            in an instance the first control flag evaluates to False, present the first user interface application to the first user.

2. A system according to claim 1, the processing unit to execute the processor-executable program code to cause the system to:
    in response to the request:
        determine a second user interface adaptation associated with the first user interface application;
        determine a second control flag associated with a second user interface adaptation and with a second condition, the second condition based on a value of second master data;
        determine the value of the second master data for the first user;
        evaluate the second control flag based on the value of the second master data for the first user; and
        in an instance the second control flag evaluates to True, apply the second user interface adaptation to the first user interface application.

3. A system according to claim 2, the processing unit to execute the processor-executable program code to cause the system to:
    receive a second request to present the first user interface application to a second user; and
    in response to the second request:
        receive the first user interface application and the at least one user interface adaptation defined and stored at design-time in a data storage;
        determine the value of the first master data for the second user;
        evaluate the first control flag based on the value of the first master data for the second user;
        in an instance the first control flag evaluates to True based on the value of the first master data for the second user, apply the first user interface adaptation to the first user interface application and present the adapted first user interface application to the second user; and
        in an instance the first control flag evaluates to False based on the value of the first master data for the second user, present the first user interface application to the second user.

4. A system according to claim 1, the processing unit to execute the processor-executable program code to cause the system to:
    receive a second request to present the first user interface application to a second user; and
    in response to the second request:
        receive the first user interface application and the at least one user interface adaptation defined and stored at design-time in a data storage;
        determine the value of the first master data for the second user;
        evaluate the first control flag based on the value of the first master data for the second user;
        in an instance the first control flag evaluates to True based on the value of the first master data for the second user, apply the first user interface adaptation to the first user interface application and present the adapted first user interface application to the second user; and
        in an instance the first control flag evaluates to False based on the value of the first master data for the second user, present the first user interface application to the second user.

5. A system according to claim 1, the processing unit to execute the processor-executable program code to cause the system to:
- receive a second request to present a second interface application to the first user; and
- in response to the second request:
- receive the second user interface application and a second at least one user interface adaptation defined and stored at design-time in a data storage;
- determine, from amongst the received second at least one user interface adaptation, a second user interface adaptation associated with the second user interface application;
- determine a second control flag associated with the second user interface adaptation and with a second condition, the second condition based on a value of second master data;
- determine the value of the second master data for the first user;
- evaluate the second control flag based on the value of the second master data for the first user;
- in an instance the second control flag evaluates to True based on the value of the second master data for the first user, apply the second user interface adaptation to the second user interface application and present the adapted second user interface application to the first user; and
- in an instance the second control flag evaluates to False based on the value of the second master data for the first user, present the second user interface application to the first user.

6. A system according to claim 5, the processing unit to execute the processor-executable program code to cause the system to:
- receive a third request to present the second user interface application to a second user; and
- in response to the third request:
- receive the second user interface application and the second at least one user interface adaptation defined and stored at design-time in a data storage;
- determine the value of the second master data for the second user;
- evaluate the second control flag based on the value of the second master data for the second user;
- in an instance the second control flag evaluates to True based on the value of the second master data for the second user, apply the second user interface adaptation to the second user interface application and present the adapted second user interface application to the second user; and
- in an instance the second control flag evaluates to False based on the value of the second master data for the second user, present the second user interface application to the first user.

7. A computer-implemented method comprising:
- receiving a request to present a first user interface application to a first user; and
- in response to the request:
- receive the first user interface application and at least one user interface adaptation defined and stored at design-time in a data storage;
- determining, from amongst the received at least one user interface adaptation, one or more user interface adaptations associated with the first user interface application;
- for each of the one or more user interface adaptations associated with the first user interface application, determining a respective control flag associated with the user interface adaptation, the respective control flag associated with a master data value;
- determining one or more of the one or more user interface adaptations associated with the first user interface application to apply to the first user interface application by evaluating the respective control flag based on the associated master data value of the first user;
- applying the determined one or more user interface adaptations to the first user interface application to generate an adapted first user interface; and
- presenting the adapted first user interface to the first user.

8. A computer-implemented method according to claim 7, comprising:
- receiving a request to present the first user interface application to a second user; and
- in response to the request:
- receive the first user interface application and the at least one user interface adaptation defined and stored at design-time in a data storage;
- determining a second one or more of the one or more user interface adaptations to apply to the first user interface application by evaluating the respective control flag based on the associated master data value of the second user;
- applying the determined second one or more user interface adaptations to the first user interface application to generate a second adapted first user interface; and
- presenting the second adapted first user interface to the first user.

9. A computer-implemented method according to claim 8, comprising:
- receiving a request to present a second user interface application to the first user; and
- in response to the request:
- receive the second user interface application and a second at least one user interface adaptation defined and stored at design-time in a data storage;
- determining a third one or more user interface adaptations associated with the second user interface application;
- for each of the third one or more user interface adaptations, determining a respective control flag associated with the user interface adaptation, the respective control flag associated with a master data value;
- determining a fourth one or more of the third one or more user interface adaptations to apply to the second user interface application by evaluating the respective control flag based on the associated master data value of the first user;
- applying the determined fourth one or more user interface adaptations to the second user interface c to generate an adapted second user interface; and
- presenting the adapted second user interface to the first user.

10. A computer-implemented method according to claim 9, comprising:
- receiving a request to present a second user interface application to the first user; and
- in response to the request:
- receive the second user interface application and a second at least one user interface adaptation defined and stored at design-time in a data storage;
- determining, from amongst the received second at least one user interface adaptation, a second one or more user interface adaptations associated with the second user interface application;

for each of the second one or more user interface adaptations, determining a respective control flag associated with the user interface adaptation, the respective control flag associated with a master data value;

determining a third one or more of the second one or more user interface adaptations to apply to the second user interface application by evaluating the respective control flag based on the associated master data value of the first user;

applying the determined third one or more user interface adaptations to the second user interface application to generate an adapted second user interface; and presenting the adapted second user interface to the first user.

11. A non-transitory medium storing processor-executable process steps, the process steps executable to cause a system to:

receive a request to present a first user interface application to a first user; and in response to the request:

receive the first user interface application and at least one user interface adaptation defined and stored at design-time in a data storage;

determine, from amongst the received at least one user interface adaptation, a first user interface adaptation associated with the first user interface application;

determine a first control flag associated with the first user interface adaptation and with a first condition, the first condition based on a value of first master data;

determine the value of the first master data for the first user;

evaluate the first control flag based on the value of the first master data for the first user;

in an instance the first control flag evaluates to True, apply the first user interface adaptation to the first user interface application and present the adapted first user interface application to the first user; and in an instance the first control flag evaluates to False, present the first user interface application to the first user.

12. A medium according to claim 11, the process steps executable to cause a system to:

in response to the request:

determine a second user interface adaptation associated with the first user interface application;

determine a second control flag associated with a second user interface adaptation and with a second condition, the second condition based on a value of second master data;

determine the value of the second master data for the first user;

evaluate the second control flag based on the value of the second master data for the first user; and in an instance the second control flag evaluates to True, apply the second user interface adaptation to the first user interface application.

13. A medium according to claim 12, the process steps executable to cause a system to:

receive a second request to present the first user interface application to a second user; and in response to the second request:

receive the first user interface application and the second at least one user interface adaptation defined and stored at design-time in a data storage;

determine, from amongst the received second at least one user interface adaptation, the value of the first master data for the second user;

evaluate the first control flag based on the value of the first master data for the second user;

in an instance the first control flag evaluates to True based on the value of the first master data for the second user, apply the first user interface adaptation to the first user interface application and present the adapted first user interface application to the second user; and in an instance the first control flag evaluates to False based on the value of the first master data for the second user, present the first user interface application to the second user.

14. A medium according to claim 11, the process steps executable to cause a system to:

receive a second request to present the first user interface application to a second user; and in response to the second request:

receive the first user interface application and at the least one user interface adaptation defined and stored at design-time in a data storage;

determine the value of the first master data for the second user;

evaluate the first control flag based on the value of the first master data for the second user;

in an instance the first control flag evaluates to True based on the value of the first master data for the second user, apply the first user interface adaptation to the first user interface application and present the adapted first user interface to the second user; and in an instance the first control flag evaluates to False based on the value of the first master data for the second user, present the first user interface application to the second user.

15. A medium according to claim 11, the process steps executable to cause a system to:

receive a second request to present a second interface application to the first user; and in response to the second request:

receive the second user interface application and a second at least one user interface adaptation defined and stored at design-time in a data storage determine, from amongst the received second at least one user interface adaptation, a second user interface adaptation associated with the second user interface;

determine a second control flag associated with the second user interface adaptation and with a second condition, the second condition based on a value of second master data;

determine the value of the second master data for the first user;

evaluate the second control flag based on the value of the second master data for the first user;

in an instance the second control flag evaluates to True based on the value of the second master data for the first user, apply the second user interface adaptation to the second user interface and present the adapted second user interface to the first user; and in an instance the second control flag evaluates to False based on the value of the second master data for the first user, present the second user interface to the first user.

16. A medium according to claim 15, the process steps executable to cause a system to:

receive a third request to present the second user interface application to a second user; and in response to the third request:

receive the second user interface application and the second at least one user interface adaptation defined and stored at design-time in a data storage;

determine the value of the second master data for the second user;

evaluate the second control flag based on the value of the second master data for the second user;

in an instance the second control flag evaluates to True based on the value of the second master data for the second user, apply the second user interface adaptation to the second user interface application and present the adapted second user interface to the second user; and in an instance the second control flag evaluates to False based on the value of the second master data for the second user, present the second user interface application to the first user.

\* \* \* \* \*